Patented Apr. 18, 1939

2,154,424

UNITED STATES PATENT OFFICE 2,154,424

METHOD OF REFINING PETROLEUM DISTILLATES

Clinton E. Dolbear, Los Angeles, Calif., assignor to Philip Wiseman, P. Kenneth Wiseman and Clinton E. Dolbear, trustees No Drawing. Application March 1, 1935, Serial No. 8,927

4 Claims. (Cl. 196—29)

This invention relates to the refining of petroleum distillates and more particularly to the elimination of gums and gum-forming compounds from sulphuric acid-treated distillates.

The invention also relates to a combined gum-removing and sweetening treatment, as an improvement of the method set forth in my co-pending application Ser. No. 756,209.

One of the particular objects of the present invention is to provide a liquid phase treatment of a sulphuric acid-treated petroleum distillate in the reduction of the content of gum and gum-forming compounds.

Another important object of the invention is to provide a two-stage degumming and sweetening process, in which the first stage is primarily effective for the removal of gums and the second stage is principally effective for sweetening a sulphuric acid-treated distillate in the manner described in said co-pending application Ser. No. 756,209, and in which the first stage also acts to place the distillate in a highly advantageous condition for the sweetening treatment of the second stage, so that the combined treatment serves to effectively remove both gums (including gum-forming compounds) and corrosive sulphur compounds.

The cracked petroleum distillates frequently contain a material quantity of gums and gum-forming substances, and it is common practice to acid-treat such distillates, neutralize and then steam or vacuum-distil to obtain a neutral product of low gum content. I have determined that certain compounds of the alkaline earth metals (elements of Group II), more particularly oxides, hydroxides, carbonates, and sulphates of metals such as calcium, barium, strontium, and magnesium, while not particularly effective in the treatment of cracked petroleum distillates which have not been acid-treated, are highly advantageous reagents in a contact treatment of a sulphuric acid-treated and preferably neutralized distillate. I have also determined that certain ones of the alkaline earth metal compounds are more effective in degumming operations and that certain of such compounds will actually cause an increase in the gum and gum-forming compound content unless the time of contact of the reagent with the distillate is carefully controlled. For example, hydrated lime, $Ca(OH)_2$, is very effective in the removal of actual and potential gums if allowed to contact a distillate for a very short time, but if the contact time is protracted, the actual and potential gums are tremendously increased. On the other hand, quick-lime, $CaO$, may be caused to remain in contact with such a distillate for a relatively long time without showing any tendency to cause a gum increase and will effectively reduce the actual and potential gum content to below a commercial limit. It will also be quite evident that, from the standpoint of cost, lime may be much more advantageously used than any of the other compounds of the group above-mentioned.

The process described in my above-mentioned co-pending application involves the use of a sweetening agent such as sodium ferrite, together with an oxidizing material such as air and is under most conditions very effective. At the same time, small amounts of moisture in the distillate undergoing treatment or small amounts of moisture or carbon dioxide or both in the air employed in the treatment have been found to materially interfere with the sweetening action of the sodium ferrite or to decrease the effective life thereof. According to one phase of the present invention, the effectiveness of sodium ferrite in the sweetening treatment is materially improved by a preliminary contact treatment of the distillate with an alkaline earth metal compound to obtain a removal of such reaction inhibiting materials, and in this connection the oxides of certain of the alkaline earth metals have been found to be more advantageous than the hydroxides, carbonates and sulphates.

In the practice of the present invention, a petroleum distillate, either a cracked or a straight-run distillate, is acid-treated in the customary manner with sulphuric or other suitable acid, desludged, and then preferably neutralized, as by treatment in well-known manner with a suitable alkaline solution such as a caustic soda or potash solution, and, if desired, again washed with water. The distillate is then in condition for the degumming treatment, and may be passed through a column of a suitably subdivided alkaline earth metal compound selected from the above-mentioned group. The degumming compound is preferably used in substantially dry condition, and care should be taken to avoid introduction of water in this operation, except for the small amount of water which may be present in the distillate or moisture which may be present in the air, in case the air to be used in the subsequent sweetening operation is passed through the degumming step along with the distillate as hereinafter mentioned. The contact of the distillate with the degumming compound may be conveniently carried out by percolation, in liquid phase, and the degumming compound is preferably subdivided by crushing or grinding so as to present a relatively large surface contact area, with due regard to the speed of percolation desired; for example, I have found that the degumming compound may be advantageously crushed to pass a one-eighth inch mesh screen. Where the above degumming treatment is to be associated with a sweetening treatment as above outlined, the distillate may then be passed through a column of a suitable oxidation catalyst, such as sodium ferrite, soda lime, caustic soda, or a metallic oxide such as red or black oxides of iron, molybdic oxide, zinc oxide or the like, in the presence of a suitable gaseous oxidizing agent such as atmospheric oxygen.

The sweetening operation is preferably carried out by passing the sour distillate, following the above-described degumming treatment, together with air or other suitable oxidizing gas, through and in intimate contact with a pervious body of an oxidation catalyst such as above mentioned, under such conditions that both the air and the distillate are caused to come into contact with the catalytic material. The catalytic treatment may be carried out in either liquid or vapor phase, and either at atmospheric or other desired higher or lower pressure, it being understood that the pressure may be so selected as to maintain the distillate largely or wholly in the desired liquid or vapor state at the particular temperature employed, or partly in liquid and partly in vapor state, as considered advisable. This treatment serves to oxidize mercaptans or other objectionable sulphur-bearing organic compounds, converting the same into alkyl disulphides or other non-corrosive compounds having no objectionable odor. As a more specific illustration of the preferred practice of this phase of the invention, a distillate and moisture-free air resulting from the degumming operation above-described may be passed concurrently downwardly through a column of subdivided sodium ferrite (—8 mesh, for example) at a rate preferably less than the free percolation rate of the distillate through such column, so that said distillate will descend through the catalytic material as a relatively thin film over the catalytic particles while leaving the voids therebetween sufficiently open to permit free flow of the oxidizing gas therethrough.

The passage of the distillate in contact with an alkaline earth metal compound in the degumming operation above described, prior to the sweetening operation, also serves to remove moisture present in the distillate, either by chemical absorption or physical entrainment or adsorption, and quick-lime is particularly effective for this purpose since it will absorb a considerable amount of water by slaking of a portion thereof. The presence of moisture in the distillate has been found to materially diminish the effective life of the oxidation catalyst and in view of the fact that some moisture is nearly always present in a distillate following acid-treatment and neutralization thereof, the preliminary treatment of such distillate in the degumming operation above set forth is of material benefit to the subsequent sweetening operation. Furthermore, the removal of gums from a distillate in the presently described manner before subjecting such distillate to the described sweetening treatment has been found to materially extend the active life of the oxidation catalyst.

According to a preferred practice of the invention, the gaseous oxidizing agent is also passed through the degumming column with the distillate, whereby effective removal of moisture and/or carbon dioxide contained in such gaseous agent is obtained and the operating efficiency of the oxidation catalyst maintained at a maximum. It will be appreciated that the presence of air or other oxidizing atmosphere is not necessary to the degumming treatment and if desired such gaseous oxidizing agent may be introduced to the distillate after passage of such distillate through the degumming column, in which case it is preferable to effect a removal of moisture and/or carbon-dioxide from such gaseous agent before such introduction, as by passing the same through a suitable absorption tower containing soda-lime or the like.

As a specific example of the employment of an alkaline earth metal compound in the degumming and sweetening of a sulphuric acid-treated and caustic neutralized gasoline, a quantity of such gasoline was passed through a column of crushed quick-lime (⅛″ mesh and finer) at such rate as to give approximately twenty minutes contact time and then through a column of an oxidation catalyst, in particular, sodium ferrite, at such a rate as to give a contact time of approximately forty minutes, at atmospheric temperature and pressure. A stream of air, passed through a tube containing soda-lime to remove water vapor and carbon dioxide therefrom, was introduced between the lime and sodium ferrite columns and passed through the latter along with the distillate. After the complete contact treatment the product was found approximately gum free, showing no weighable gum residue by the copper dish method, and was Doctor sweet.

I am acquainted with the fact that numerous applications have been made of alkaline earth compounds to the neutralizing of acid stocks, but it is generally considered that a hydrated compound such as calcium hydroxide is more effective than a compound such as calcium oxide. In a degumming treatment according to the instant process, however, the oxide compounds are materially more effective than the hydrated compounds, indicating that the reactions involved in the neutralizing and degumming treatments are quite different.

The quick-lime used in the above treatment becomes partially weakened after treatment of a considerable quantity of distillate, principally due to the partial hydration thereof caused by the small amount of moisture existing in the distillates, as well as to the adsorption of gums and gum-forming compounds, and the treating mass may be revivified by simple calcination, preferably at a red heat. I have not been able to detect any appreciable loss of the treating compound even after prolonged and repeated use, which indicates that the compounds do not enter into reaction with the distillate constituents in any such manner as that encountered in neutralizing processes.

While quick-lime is given as an example of a preferred alkaline earth metal compound for use in the above degumming procedure, it has been found that the oxides, hydroxides, carbonates, and sulphates of other metals of Group II are also quite effective, both in the actual degumming process and in placing the distillate in a more advantageous condition for the sweetening treatment with an oxidation catalyst. Certain of the metals of Group II are, of course, economically impractical, the most practical compounds being the oxides and hydroxides of calcium, magnesium, strontium, and barium. Of these, calcium oxide is the most readily available and consequently the most advantageous, and also appears to be much the best from the standpoint of effectiveness for the present purpose. With a good quality of quick-lime and any of the usual acid-treated gasolines, one cubic foot of quick-lime will treat in excess of five barrels per twenty-four hours. Quick-lime is also capable of treating a relatively large volume of distillate before revivification is necessary, dependent, of course, upon the gum and moisture content of the distillate undergoing treatment, and also upon the moisture and carbon dioxide content of the air, in case air is passed in contact with the lime along with the distillate, preparatory to the passage thereof through sodium ferrite as above described.

I claim:

1. The method of removing gums, gum-forming compounds, and objectionable sulphur-bearing organic compounds from an acid-treated petroleum distillate, which comprises: bringing such a distillate, in liquid phase, into contact with a material consisting substantially wholly of an inorganic compound of an alkaline earth metal which will react to cause removal of gums, gum-forming compounds and moisture from said distillate by such contact; and then passing the contacted distillate, in the presence of a gaseous oxidizing agent and in the substantial absence of water, into contact with a solid oxidation catalyst comprising sodium ferrite.

2. The method of removing gums, gum-forming compounds and objectionable sulphur-bearing organic compounds from an acid-treated petroleum distillate which comprises: bringing such a distillate in liquid phase, together with air, into contact with a material consisting substantially wholly of an inorganic compound of an alkaline earth metal which will react to cause removal of gums, gum-forming compounds and moisture from said distillate and moisture and carbon dioxide from said air by such contact; removing said distillate, substantially wholly in liquid phase, from contact with said material; and then passing the contacted distillate and air into contact with a solid oxidation catalyst comprising sodium ferrite.

3. The method of removing gums, gum-forming compounds, and objectionable sulphur-bearing organic compounds from an acid-treated petroleum distillate, which comprises: bringing such a distillate, in liquid phase, into contact with a material consisting substantially wholly of quick-lime to cause removal of gums, gum-forming compounds and moisture from said distillate by such contact; and then passing the contacted distillate, in the presence of a gaseous oxidizing agent and in the substantial absence of water, into contact with a solid oxidation catalyst comprising sodium ferrite.

4. The method of removing gums, gum-forming compounds, and objectionable sulphur-bearing organic compounds from an acid-treated petroleum distillate which comprises: bringing such a distillate in liquid phase, together with air, into contact with a material consisting substantially wholly of quick-lime to cause removal of gums, gum-forming compounds and moisture from said distillate and moisture and carbon dioxide from said air by such contact; removing said distillate, substantially wholly in liquid phase, from contact with said material; and then passing the contacted distillate and air into contact with a solid oxidation catalyst comprising sodium ferrite.

CLINTON E. DOLBEAR.